E. T. TURNER.
AUTOMOBILE DESIGN AND CONSTRUCTION.
APPLICATION FILED MAR. 15, 1920.
1,407,048.
Patented Feb. 21, 1922.
5 SHEETS—SHEET 3.
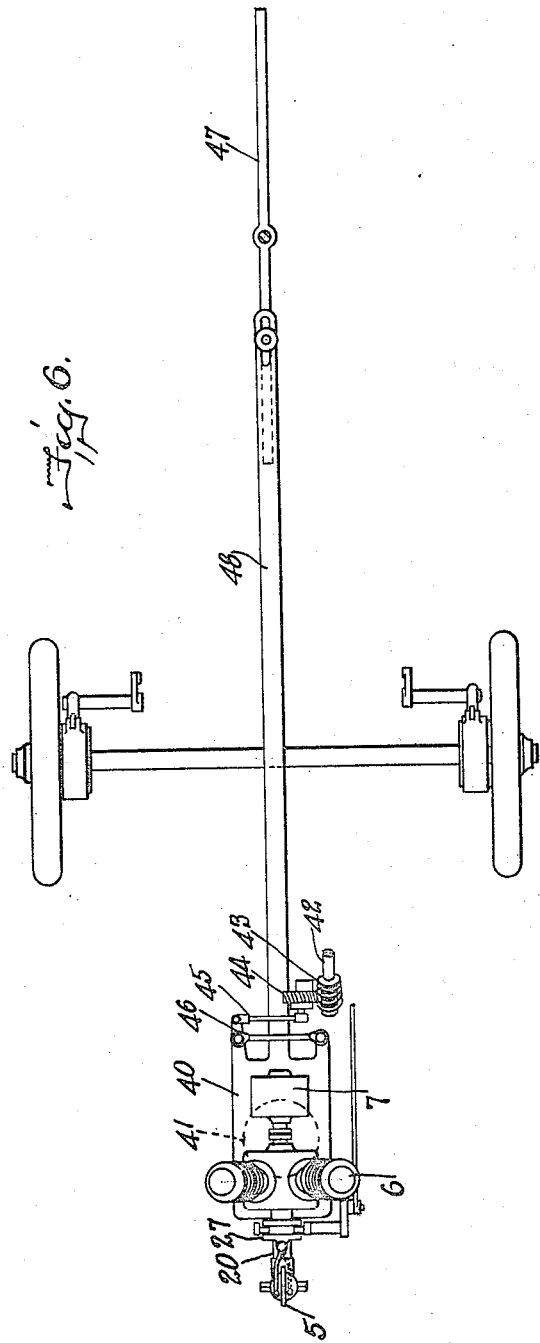
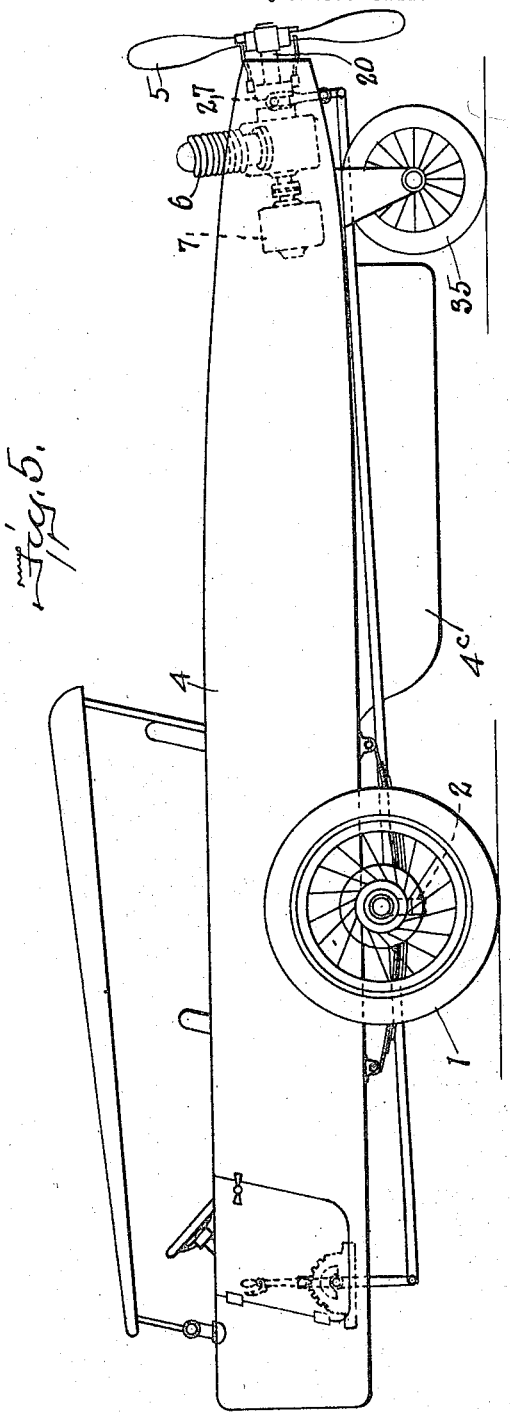
INVENTOR.
Edward T. Turner,
BY Toulmin & Toulmin,
ATTORNEYS.

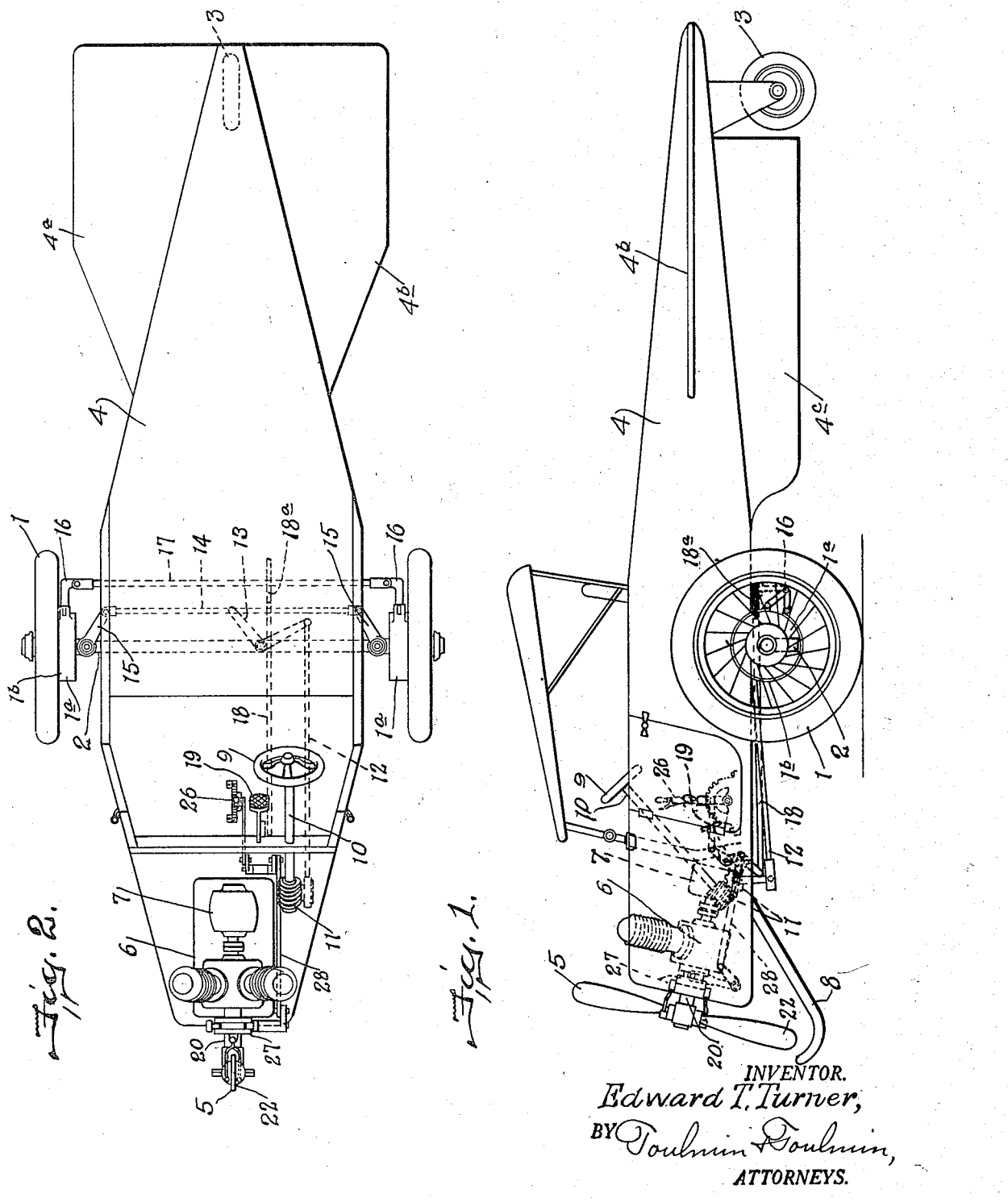

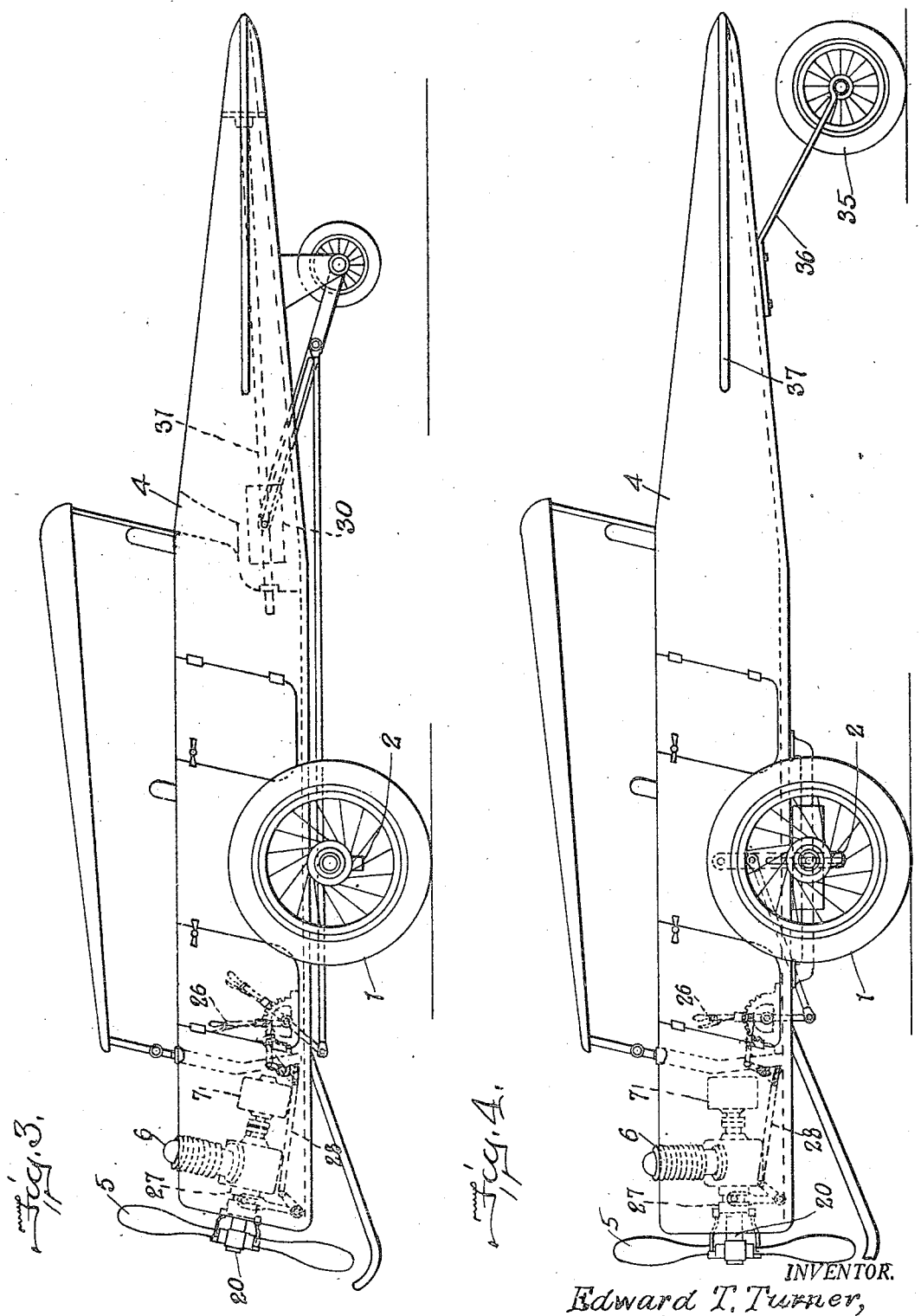

E. T. TURNER.
AUTOMOBILE DESIGN AND CONSTRUCTION.
APPLICATION FILED MAR. 15, 1920.
1,407,048.
Patented Feb. 21, 1922.
5 SHEETS—SHEET 4.
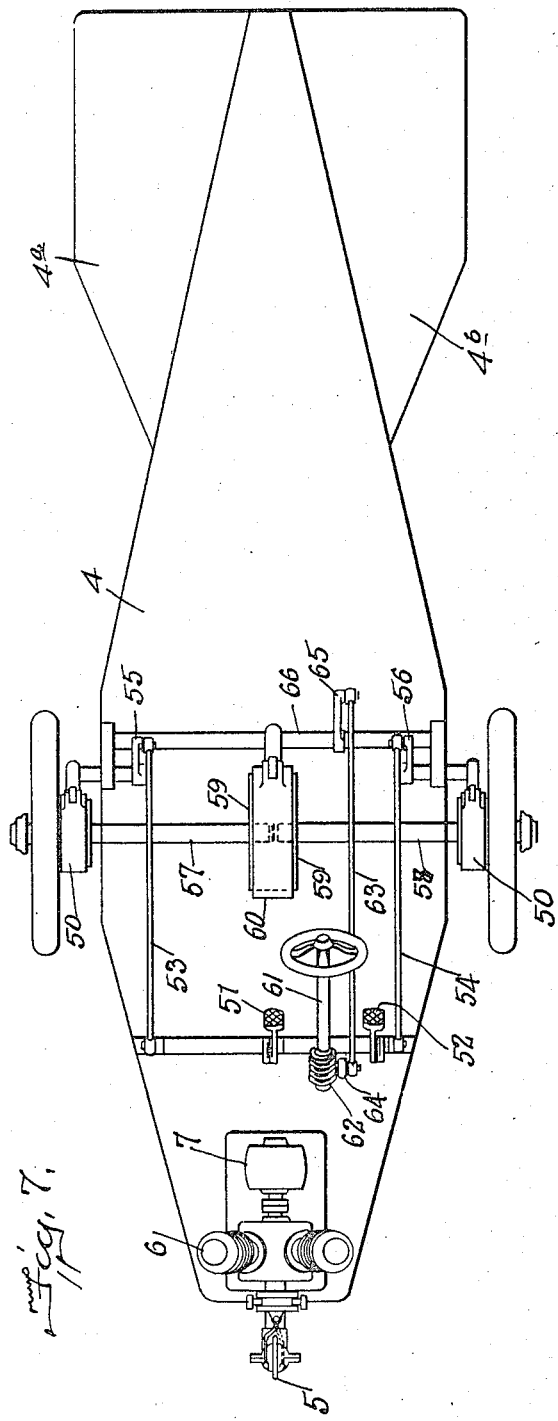
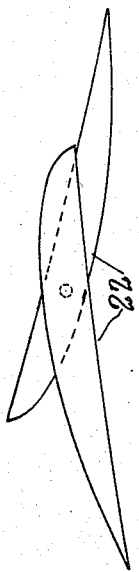
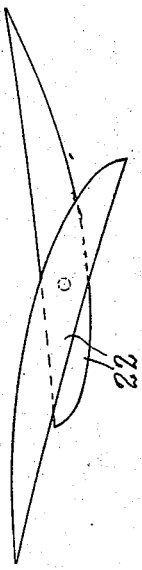
INVENTOR.
Edward T. Turner,
BY Toulmin + Toulmin,
ATTORNEYS.

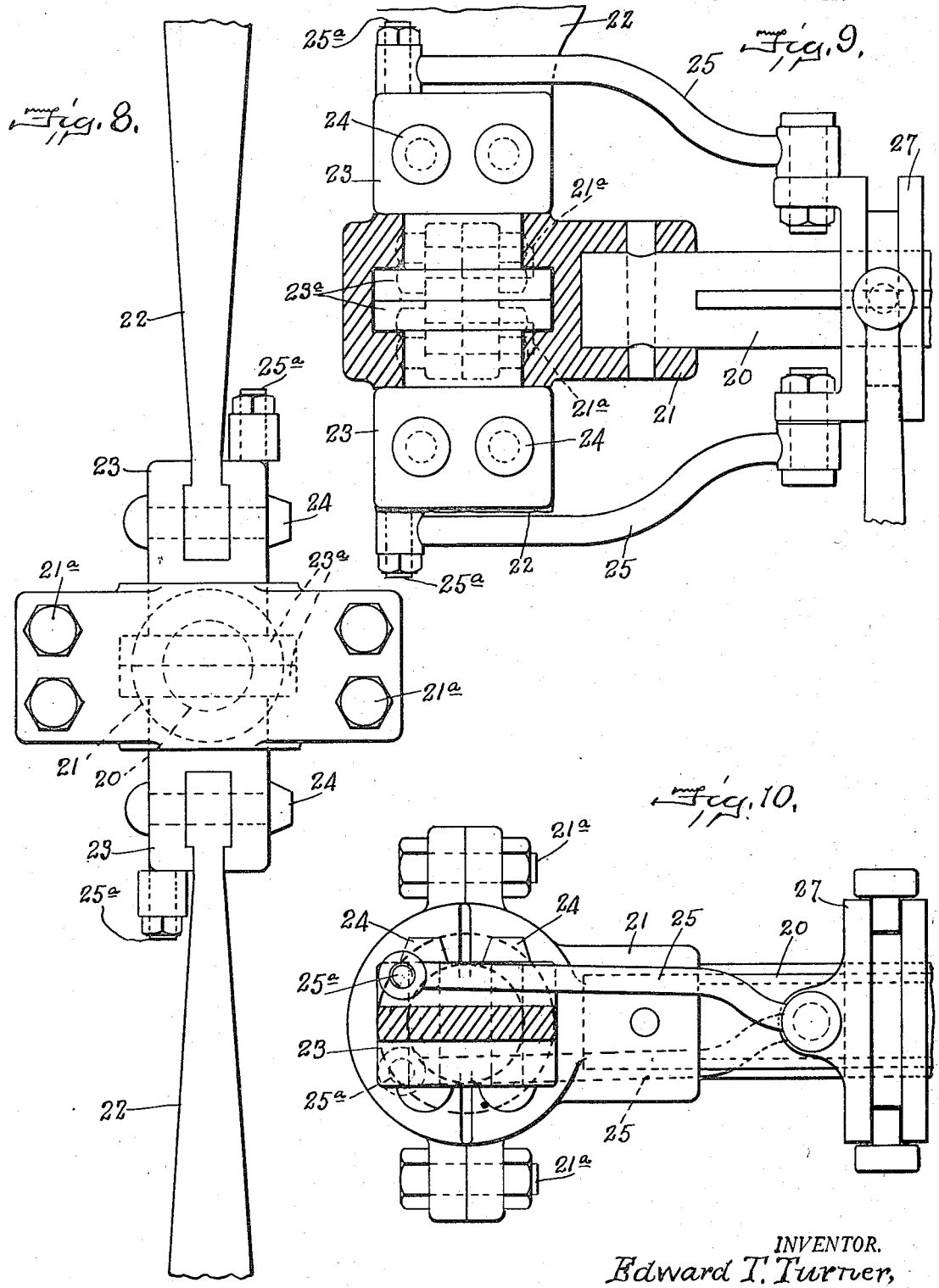

UNITED STATES PATENT OFFICE.

EDWARD T. TURNER, OF DAYTON, OHIO.

AUTOMOBILE DESIGN AND CONSTRUCTION.

1,407,048.  Specification of Letters Patent.  Patented Feb. 21, 1922.

Application filed March 15, 1920. Serial No. 365,690.

*To all whom it may concern:*

Be it known that I, EDWARD T. TURNER, a citizen of the United States, residing at Dayton, in the county of Montgomery and State of Ohio, have invented certain new and useful Improvements in Automobile Designs and Constructions, of which the following is a specification, reference being had therein to the accompanying drawing.

This invention relates to improved automobile design and construction, the underlying principles of the invention being radically different from the usual type of automobiles and of fundamental character, being employed for the first time, so far as I am aware, in this art.

An object of my invention is to provide an automobile of cheaper and simpler construction, cheaper to operate than automobiles of present construction, and which will be of neat appearance and surpassing action in its operation on the roads.

A feature of the invention is the elimination of all transmission and differential gearing including universal joints and clutches. Thus the car is simpler to operate because there are no gears to shift. Also one set of ground wheels and springs and one axle are eliminated as well as a great amount of weight.

Thus the manufacturing cost of the machine will be materially reduced, and the operating cost and maintenance cost will be less than that of an ordinary automobile, first, because there is less gear, less wear, less depreciation, less repair, and, the machine being much lighter, there is less wear on the tires and less fuel required.

The driving power of the machine may consist of any suitable motor which may be mounted either in the front or rear of the machine and equipped with a propeller of suitable construction which acts as the driver for the machine, the propeller blades being adjustable relative to the angle of their working face, whereby both forward and reverse travel may be effected of the machine, thus distinguishing the construction and operation of the propeller from that of an aeroplane which is adapted to drive in the forward direction only.

As here shown, in one form, the propeller is mounted at the front end of the machine, and in another form at the rear of the machine. With the type of vehicle shown either the front or rear is a suitable location for the propeller, but it will be obvious that with suitable modification of structural design, the propeller might be located to equal or better advantage at a suitable intermediate point, without departing from the underlying principle and spirit of the invention.

The chassis of the machine in a preferred form of construction will be similar in general features to that of an aeroplane. The body of the machine is supported near its central portion on the axle of a single truck having the motor and front portion of the body overhanging the truck, its rear body portion being extended a considerable distance rearwardly and tapered similarly to the fuselage of an aeroplane, thus giving a graceful, stream-line effect to the machine.

When the machine is at rest its greatest weight, or center of gravity of the machine as a whole may be either rearward or in advance of the axle or substantially over, according to the design or construction of the machine, thus acting to hold one end of the machine suspended above the ground, the other end being carried by a suitable supporting wheel. When the machine is in travel, however, even at low velocity, the tendency of the weight above the axle is to ride at pivot balance on the axle, both ends of the body being free of the ground, the effect of the action being to cause the machine to travel very lightly on the ground, air planes, being used, as shown, on the rear portion of the machine to stabilize the balanced relation of the machine relative to the axle and supporting wheels.

The steering of the machine may be accomplished in any suitable manner. As here shown, in one form the ground wheels are mounted on vertical pivot bearings to meet the requirements of combined steering and supporting wheels, suitable mechanism being provided for accomplishing the steering movements of the wheels. The wheels are further provided with suitable brake mechanism to control the movements of the machine.

In another form the motor and propeller are pivotally mounted and controlled by suitable mechanism to effect the steering of the machine, and in still another form steering of the machine is effected by special brake mechanism whereby the ground wheels may be controlled independently of each other, the wheels in this form of construction having rigid axles.

A novel feature of the improved automobile consists in the manner of mounting the propeller relative to the axle of the supporting wheels. As here shown, the propeller is mounted to have its axial center, or center line of pull, intersect or substantially so, with the center line of rotation of the supporting wheels. Thus the pull of the propeller will be direct on the center line of rotation, thereby avoiding either up or down pull, or tilting action on the machine in either direction as would be the case if the center lines did not substantially intersect, whereby the floating balance of the machine in motion and at rest will be maintained regardless of push or pull on the propeller. The machine is also so designed that the center of gravity of occupants seated in the machine will pass through or near the center line of rotation of the supporting wheels; these features serving as a further means to maintain or stabilize the floating equilibrium of the machine regardless of the load when the same is in travel.

From the foregoing general description of the invention its fundamental principles as distinguished from an aeroplane will be apparent. In an aeroplane no provision is made for backing the machine, which, in the present invention, is provided for by the adjustable propeller blades. In present forms the aeroplane has no means for braking to check the speed or otherwise control the movements of the machine, as distinguished from the novel brake mechanism of the present invention. The rear of an aeroplane will drag on the ground except at very high velocity and if it were not for the wings, the tail alone would not lift the rear of the machine at any reasonable velocity owing to the location of the center of gravity with reference to the vehicle, as distinguished from my improved automobile which will ride free of the ground at both ends and travel in a floating or balanced relation on the ground wheels. In propellers ordinarily used on aeroplanes the ratio of pull to the power is low. Thus the propellers will not give high pulls at low speed; which is overcome in the present invention by using specially designed propellers in which the ratio of pull to the power is relatively high, thus developing a high pull at low velocity. Also with the present type of aeroplanes the machine cannot turn sharply at low speeds, whereas in my improved automobile by the combined action of the special propellers and the steering movements the machine can readily be maneuvered on short turns at low speed.

An important advantage is also obtained in the propeller operated machine over an ordinary automobile in the action of the machine on grades, either in starting the machine on grades or in ascending steep grades. The pull of the propeller on the machine being direct, acceleration of the propeller-operated machine will be quicker than that of an ordinary automobile equipped with the usual change gear drive.

Other improvements and points of advantage will be apparent from the following detailed description of the construction and operation of the automobile and from the illustrations in the accompanying drawings in which the invention is shown in one form of preferred construction.

In the accompanying drawings:—

Fig. 1 is a side elevation of an automobile in which my invention in one form has been applied;

Fig. 2 is a plan view of the same;

Figs. 3, 4 and 5 are side elevations, respectively, of modified types of construction over the construction shown in Figs. 1 and 2;

Figs. 6 and 7 are plan views of the ground wheels and motor illustrating modified forms of steering mechanism;

Figs. 8, 9 and 10 are detail views showing the construction of the reversible propellers; and Figs. 11 and 12 are detail views of the propeller blades showing their peculiar mounting in the present construction.

As shown in the drawings, the automobile is essentially a two-wheel vehicle, except for the wheel which serves to support one end of the machine when at rest. In operation, therefore, the automobile is a two-wheel vehicle, the ground wheels 1 and axle 2 being disposed intermediate the ends of the body slightly in advance or in the rear of the center line of gravity of the machine as a whole, so that when the machine is at rest the supporting wheel 3 will be on the ground and one end of the machine will be suspended above the ground, the body of the machine having a vertical pivotal movement on the axle 2. When the machine is at rest the center line of gravity of occupants of the machine will substantially intersect the center line of rotation of the ground wheels, whereby the normal position of the machine with one end resting on the ground will be maintained.

The body of the machine is very similar to that of the usual construction of an automobile, except the rear portion 4 of the body which is shaped, as here shown, similar to the rear body or fuselage of an aeroplane, the purpose of the rear arrangement being to maintain lightness of construction and to stabilize the floating position of the body when the machine is in action; also to add to the stream-line effect and general attractiveness of design. Horizontally disposed tail planes $4^a$ and $4^b$ secured to the rear body of the machine and a vertical plane or keel 4ᶜ secured relative to the tail, as here shown, may be employed, to stabilize the rear movements of the machine, the horizontal planes serving also to maintain the balanced relation of the machine on the wheels when in travel.

Any suitable motor, preferably an air cooled motor, may be employed for actuating the propeller 5, the position of the motor 6 being indicated in conventional form by dotted lines in Fig. 1; a starter 7 of any suitable construction being used to set the motor in operation. The propeller, as here shown, may be secured to the crank shaft of the motor, or connected to the motor, in any other suitable manner. A propeller guard 8 is provided at the front end of the machine and serves the double purpose of limiting the forward tilting movement of the machine and preventing the propeller striking the ground.

The steering mechanism here shown is merely illustrative, as any suitable mechanism may be employed for steering the vehicle. As shown, a steering wheel 9 and steering post 10 are placed in the usual relation to the driver's seat, and worm gears 11 and a shaft 12 connect the steering wheel to a bell crank lever 13 which is pivoted on the body of the machine and serves to impart longitudinal movement to a steering rod 14 connecting the opposite steering arms 15 which are secured to the upper ends of the vertical steering shafts (not shown) connected directly to the wheel spindles, the vertical steering shafts being, as here shown, confined within the brake drums 1ᵃ of the wheels 1. Thus by manipulating the wheel 9 the steering of the vehicle will be accomplished.

It is obvious, of course, that the rear supporting wheel 3 may also, by suitable construction and connections, be utilized as part of the steering means for the vehicle. Thus by mounting the wheel on a vertical shaft, with connections to the steering wheel to control the turning movements thereof the steering of the vehicle may be readily accomplished. Such an arrangement may be in combination with the steering movements of the main wheels 1, or may be independent of any steering movement of the main wheels in which event the latter may be without steering movement except that their turning movements would be responsive to the steering movements of the wheel 3.

The brake mechanism for the wheels of the vehicle may also be of any suitable form to suit the requirements of the invention. It will be understood that the reversibility of the propeller blades serves as one means for braking or checking the speed of the vehicle. It is desirable, however, to provide brake mechanism for the wheels 1 whereby the movements of the machine may be controlled in the usual manner.

The wheel brake mechanism here shown in one form consists of the brake drums 1ᵃ which are secured to the wheels 1 in the usual manner, except, of course, that it is unusual to combine brake mechanism with the steering wheels of motor operated vehicles; brake bands 1ᵇ which have their ends secured, respectively, to an arm 16 and link 17, whereby with the forward pull of the arm the brake bands 1ᵇ will be drawn taut on the brake drums 1ᵃ and thus effect braking of the machine. The arms 16 are connected at their opposite ends to a brake bar 17 extending transversely between the steering wheels and connected at its central portion to a brake bar 18 which extends toward the front of the machine and is connected to a foot pedal 19, whereby braking of the machine in travel may be effected in the usual manner. An emergency or hand brake lever (not shown) may also be employed in any suitable manner in connection with the herein described brake mechanism. To compensate for the turning movements of the steering wheels and the variable axial planes of the brake bar 17 relative to the bar 18, an elongated bearing slot 18ᵃ is provided in the end of the bar 18, thus providing for the required amount of free movement between the parts.

Reversing of the propeller blades may be accomplished in any suitable manner. This, however, is an important feature of the invention and is difficult of accomplishment. As here shown, the propeller blades are connected directly to the crank shaft 20 of the motor 6 by means of a hub bearing 21, the manner of securing the shaft to the bearing being the usual practice of drilling and pinning. The propeller blades 22 are mounted in the hub 21 to have limited rotative movement relative thereto, the extent of rotation in the construction here shown being substantially 150° for each propeller which serves to effect the change in the angular relation of the working faces of the propellers required to reverse the driving action of the propellers,—that is to say, changing the working angle of the propeller blades 150° from normal will cause the propeller to reverse the direction of movement of the machine. The extent or degree of angular adjustment of the propeller blades may, of course, be substantially more or less than 150° to accomplish the most effective reverse driving action of the blades, the extent of the adjustment being determined by the shape of the blades.

To provide for reversing the propeller blades the inner ends of the blades are provided with hub bearing studs or butt shafts 23 which have enlarged bearing heads 23ᵃ within the hubs 21, the hubs 21 being divided and secured together by bolts 21ᵃ to provide for machining of the bearings and assembling of the parts. Thus the bearing heads 23ª will act to take the outward thrust of the propeller blades and also to provide a suitable bearing for their reversing movement.

The propeller blades, as here shown, are secured in the outer ends of the bearing butt shafts 23 by rivets 24. The reversing of the blades is accomplished by means of adjusting rods 25, an adjusting rod being secured to each blade by means of a stud 25ª to effect rotation thereof relative to the hub 21.

The propeller blades in the form here shown are secured to the hub 21 with the center line of the stud shafts 23 off-center relative to the longitudinal center line of the blades, their axial center line being toward the working edge of the propellers at a point substantially one-third of the mean width of the blades as illustrated in Figs. 11 and 12.

The shape of the propeller blades, as here shown, conforms to the government standards of construction and, therefore, does not require detailed description except that the angle of the working face of the blades is of special design to suit the purposes of the present invention. It will be understood, however, that blades of modified construction and shapes may be used as required for different types of vehicles; also that propellers having more than two blades may be used without departing from the feature of reversibility or other novel features of construction.

Reversing of the propeller blades may be accomplished from the driver's seat by means of any suitable reversing lever or mechanism, here shown as an ordinary shifter lever 26 having three positions of adjustment, i. e., the normal driving position whereby the propellers will be adjusted to drive the machine in the forward direction, the reverse position to adjust the propellers to back the machine, and the intermediate neutral position wherein the action of the propeller will be neutralized, that is, to say, operation of the propeller with the blades in neutral position will not drive the machine in either direction. To provide for rotation of the reversing rods 25 with the propeller, the opposite ends of the rods are connected to an intermediate shifter collar 27 which is slidably mounted on the engine shaft 20 and adapted to rotate therewith, any suitable connection, as by a rod 28, being made between the collar 27 and the control lever 26.

As herein stated the center line of rotation of the propeller intersects, or substantially so, with the center line of rotation of the ground wheels of the machine, being out of parallelism with the longitudinal center line of the machine as a whole, and having the effect of raising the axis of the propeller and the front end of the machine sufficiently to permit of free action of the propeller relative to the ground, and the further effect as already explained of maintaining the balanced relation of the machine as a whole relative to the ground wheels.

The arrangement here shown is largely for the purpose of illustrating the underlying principles of the invention rather than to show exact details of construction. It will be understood therefore that various modifications of arrangement and construction may be made from those here shown without departing from the broad fundamentals and spirit of the invention.

With suitable modifications in body construction the improved automobiles may readily be adapted to single and double seat machines. In Figs. 3, 4 and 5 I have shown suitable modifications for two-seat machines, it being understood that a wide range of modifications relative to body shapes and construction is possible within the scope of the invention.

In Fig. 3 a two-seat machine is shown of the general type of the one-seat machine shown in Figs. 1 and 2. To compensate for the weight of the passengers in the rear seat, a weight element 30 is employed, the weight being normally, when the machine is unoccupied, or when the front seat only is to be occupied with passengers, in neutral position over the axle of the main supporting wheels, and adapted to be adjusted forwardly when the rear seat is to be occupied according to the weight to be carried.

As here shown, the weight 30 is mounted to slide on a supporting rod 31 in the body of the machine, any suitable means being employed to adjust the weight according to the variation in passenger weight to be carried.

The type of machine shown in Figs. 4 and 5 is radically different from that shown in Figs. 1, 2 and 3. In this type of machine the axis of the propeller is substantially parallel to the longitudinal center line of the machine or to the wheel base line. The balanced or floating relation of the machine in travel is not provided for, except that planes may be used on the rear portion of the body as in the other constructions to minimize the weight on the rear ground wheels.

The steering and braking mechanism, and the reversible feature of the propeller in this machine are substantially the same as in the other types of machines illustrated, but the rear of the machine remains in contact with the ground at all times, as distinguished from the floating action of the other types of machines. The rear supporting wheels as here shown may consist of one or more small ground wheels 35 supported on a suitable axle and connected to the body of the machine by spring plates 36, planes 37 being used preferably to minimize dead weight carried by the rear wheels and to stabilize the vertical swing of the rear of the machine.

It will be obvious that in this type of machine counter weights will not be required to compensate for variable passenger weights.

In the construction shown in Fig. 5, the motor and propeller are mounted at the rear end of the machine as distinguished from the other types in which the propeller and motor are mounted at the front of the machine. While as here shown the center line of rotation of the propeller is substantially parallel to the wheel base line it will be understood that in the types of machines shown in Figs. 1, 2 and 3 that the propeller, if mounted at the rear will preferably have its center line of rotation intersect the center line of rotation of the ground wheels substantially the same and for the same reason as in the other forms in which the propeller is mounted at the front.

The machines shown in Figs. 3, 4 and 5 are two-seat machines, the machine shown in Figs. 1 and 2 having but a single seat. It will be understood that it is merely a matter of properly balancing the weight relative to the supporting axle in the type of machine shown in Figs. 1 and 3 to effect the balanced relation of the body of the machine to the axle. As herein stated this will be effected, first in the design and construction of the machine by properly distributing the weight on the axle, and, second, by the use of an adjustable weight element, or its equivalent, to compensate for variations in the load.

In Fig. 6 a construction is shown wherein the engine and propeller are pivotally mounted and provided with suitable mechanism to effect the steering of the machines. In this type of machine the wheels may be mounted on rigid spindles and the steering may be effected entirely by controlling and varying the line of drive or pull of the propeller relative to the center of rotation of the ground wheels and longitudinal center line of the machine.

Any suitable steering mechanism may be provided for effecting the pivotal movements of the engine and propeller. The mechanism here shown for illustrative purposes consists of the engine frame or base 40 which is mounted to rotate about a pivotal base 41, the frame and engine and the propeller being at all times in the same relation to each other, and all rotating about the center 41. The frame is connected to the steering post 42, by means of worm gear mechanism 43—44 and a link 45, a second link 46, serving to connect and brace the opposite side of the frame. Thus by manipulating the steering wheel the angle of pull of the propeller may be varied to effect the steering of the vehicle, the movements being further aided by adjustment of the rudder 47, which is operatively connected to the engine frame 40 by a rigid bar 48, which acts to turn the rudder in accordance to the turning movement of the vehicle.

In Fig. 7, a modified form of brake mechanism is shown which is adapted to steer the machine. The construction here shown is for illustrative purposes only and consists of a brake drum 50 for each ground wheel, the brake bands of the respective wheels being connected to foot levers 51 and 52 by rods 53 and 54, and levers 55 and 56, respectively, the ground wheels, as here shown, being mounted to rotate with shafts 57 and 58 which are provided at their inner ends with opposite brake drums 59, controlled by a common brake band 60 connected to the steering post 61 by worm gear mechanism 62, connecting rod 63, cranks 64—65 and shaft 66.

The brake for each wheel may thus be operated independently by the foot levers and the machine steered accordingly, and the common brake mechanism for both wheels may be actuated simultaneously to check or control the speed of the machine by manipulating the steering wheel which in the present construction, however, is used only for braking purposes. It is obvious of course that all the brakes may be operated simultaneously, or either of the direct wheel brakes with the common brake, or both direct wheel brakes independently of the common brake.

In Figs. 11 and 12 the off-set feature of the propeller blades is shown in the two extreme positions of the blades for forward and reverse drive. It has been found by experience that the mean or center line of pressure of propellers of standard construction is located relative to the working edge of the blade substantially one-third of the distance from the working edge to the opposite edge.

Thus in propellers of standard construction the torsional action on the blades in rapid operation is very pronounced. To overcome all torsional action on the blades, or substantially so, in the improved propeller contemplated for use in connection with the present invention, in view of the reversability of the blades, the axial center of the blades is made to substantially coincide with the center line of pressure, or between the longitudinal center line of the blades and their working edge.

As herein stated, and as will be apparent from the drawings and description, this invention is of basic or generic character and has been so treated in the general or illustrative forms of construction shown, as well as in the appended claims in which the invention is defined in broad comprehensive terms without reference to exact details of construction. It will be understood therefore that various and suitable modifications in construction may be made within the scope of the invention without departing from the fundamental principles and spirit thereof.

As far as I am aware, I am the first to employ these broadly distinguishing features from the present practice of automobile construction, and I desire to claim the invention broadly, therefore, relative to the underlying or fundamental principles comprised therein as set forth in various broad combinations of elements and important details of construction in the appended claims.

Having thus fully described my invention, what I claim as new and desire to secure by Letters Patent, is:—

1. In a motor-operated vehicle, the combination, of a supporting axle, parts supported thereby and extending forwardly and rearwardly of the axle and having their greater weight slightly to one side of said axle, whereby most of said parts will be supported by the axle and a support for the other parts when the automobile is at rest, a propeller having adjustable blades for propelling the vehicle and an operating means near the heavier end of the machine for raising that end free of the ground when the automobile is in travel.

2. In a motor-operated vehicle, the combination, of a supporting axle, a body mounted on the axle and extending rearwardly and forwardly of the axle, and having its greater weight slightly to one side of said axle, whereby one end of the body will be suspended above the ground and the other end will be supported on the ground when the automobile is at rest, said body having a seat for passengers arranged near the axle whereby the center of gravity of passengers occupying said seat will be near the axle, a blade propeller for propelling the vehicle, and means on the heavier end of the machine for raising that end free of the ground when the automobile is in travel.

3. In a motor-operated vehicle, the combination, of a supporting axle, a body pivotally mounted on and having its greater weight slightly to one side of said axle, whereby one end of the body will be suspended above the ground and the other end will be supported on the ground when the automobile is at rest, an air blade propeller for propelling the vehicle, and means comprising a plane on the rear portion of the body of the machine, whereby both ends of the machine will be balanced free of the ground when the automobile is in travel.

4. In a motor-operated vehicle, the combination, of a supporting axle, a body pivotally mounted on and having its greater weight slightly to one side of said axle, whereby one end of the body will be suspended above the ground and the other end will be supported on the ground when the automobile is at rest, means comprising a long rearward-tapered tail of the machine and a horizontally disposed plane around said tail, and a keel secured on one side of the tail whereby the machine will be balanced and stabilized on said axle when in travel.

5. In a motor-operated vehicle, the combination, of a supporting axle, a body pivotally mounted on and having its greater weight slightly to one side of said axle, whereby one end of the body will be suspended above the ground and the other end will be supported on the ground when the automobile is at rest, a propeller having adjustable blades operated by the motor of said vehicle whereby the machine is driven, and means on the rear end of the body of the machine for raising said end free of the ground when the automobile is in travel.

6. In a motor-operated vehicle, the combination, of a supporting axle, a body pivotally mounted on and having its greater weight slightly to one side of said axle, whereby one end of the body will be suspended above the ground and the other end will be supported on the ground when the automobile is at rest, a propeller having reversible blades, and operated by the motor of said vehicle whereby the machine may be driven in either direction and the speed of the machine may be controlled and means on the rear end of the body for lifting it free of the ground when the vehicle is in motion.

7. In a motor-operated vehicle, the combination, of a supporting axle, a body pivotally mounted on and having its greater weight slightly to one side of said axle, whereby one end of the body will be suspended above the ground and the other end will be supported on the ground when the automobile is at rest, a propeller having reversible blades adjustable from the seat of the operator whereby the machine may be driven in either direction and the speed of the machine may be checked and means on the rear end of the body for lifting it free of the ground when the vehicle is in motion.

8. In a motor-operated vehicle, the combination, of a supporting axle, a body pivotally mounted on and having its greater weight on one side of said axle, whereby one end of the body will be suspended above the ground and the other end will be supported on the ground when the automobile is at rest, a propeller having reversible blades adjustable from the seat of the operator and operable in one direction to drive the machine in either direction and to check the speed of the machine.

9. In a motor-operated vehicle, the combination, of a supporting axle, a body pivotally mounted on and having its greater weight slightly to one side of said axle, whereby one end of the body will be suspended above the ground and the other end will be supported on the ground when the automobile is at rest, a propeller having reversible blades adjustable to a plurality of predetermined positions to determine the direction of travel of said machine, the axis of adjustment of the blades being off-center relative to the longitudinal center thereof whereby the machine may be driven in either direction and means on the rear end of the body for lifting it free of the ground when the vehicle is in motion.

10. In a motor-operated vehicle, the combination, of a supporting axle, a body pivotally mounted on and having its greater weight on one side of said axle, whereby one end of the body will be suspended above the ground and the other end will be supported on the ground when the automobile is at rest, a propeller having reversible blades adjustable to reverse and to neutralize the propeller drive whereby the machine may be driven in either direction or maintained at rest when the propeller is operating.

11. In a motor vehicle, the combination, with supporting wheels, of a machine body pivotally supported relative to said wheels, an air propeller mounted on said body, operable by the motor of said vehicle, and having its center of rotation substantially intersecting the center line of rotating of said wheels.

12. In a motor vehicle, the combination, with supporting wheels, of a machine body pivotally supported relative to said wheels, an air propeller mounted on said body, operable by the motor of the vehicle, and having its center line of rotation out of parallelism with the wheel base of the vehicle, and substantially intersecting the center line of rotation of said wheels.

13. In a motor vehicle, the combination, with supporting wheels, of a vehicle body pivotally mounted relative to said wheels and adapted to ride in balanced relation thereto, a seat near the axle and a weight element carried by said machine and adjustable relative to the axis of said wheels to compensate for variable loads carried by the vehicle and means on the rear end of the body for lifting it free of the ground when the vehicle is in motion.

14. In a motor vehicle, the combination, with supporting wheels, of a vehicle body pivotally mounted relative to said wheels and adapted to ride in balanced relation thereto, a seat near the axle and a weight element carried by said machine normally in neutral relation relative to the axis of said wheels and being adjustable relative to said axis to compensate for variable loads of the machine and means on the rear end of the body for lifting it free of the ground when the vehicle is in motion.

15. In a motor vehicle, the combination, with supporting wheels, of a vehicle body pivotally mounted relative to said wheels and adapted to ride in balanced relation thereto, a weight element carried by said machine and adapted to be variably adjusted relative to the axis of said wheels in accord with and to compensate for variable loads of the machine.

In testimony whereof, I affix my signature.

EDWARD T. TURNER.